United States Patent
Fischer et al.

(10) Patent No.: US 8,531,456 B2
(45) Date of Patent: Sep. 10, 2013

(54) AUTOMATIC REMESHING BY MAPPING A 2D GRID ON 3D GENUS-G MESHES BASED ON TOPOLOGICAL ANALYSIS

(75) Inventors: Anath Fischer, Haifa (IL); Dvir Steiner, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 1297 days.

(21) Appl. No.: 11/911,902

(22) PCT Filed: Apr. 20, 2006

(86) PCT No.: PCT/IL2006/000492
§ 371 (c)(1),
(2), (4) Date: Jun. 9, 2008

(87) PCT Pub. No.: WO2006/111976
PCT Pub. Date: Oct. 26, 2006

(65) Prior Publication Data
US 2009/0128556 A1 May 21, 2009

Related U.S. Application Data

(60) Provisional application No. 60/672,614, filed on Apr. 18, 2005.

(51) Int. Cl.
*G06T 17/00* (2006.01)

(52) U.S. Cl.
USPC ............................ 345/420; 345/419; 345/423

(58) Field of Classification Search
None
See application file for complete search history.

(56) References Cited

U.S. PATENT DOCUMENTS

| | | | | |
|---|---|---|---|---|
| 5,768,156 | A * | 6/1998 | Tautges et al. | 703/2 |
| 6,373,489 | B1 * | 4/2002 | Lu et al. | 345/423 |
| 6,389,154 | B1 * | 5/2002 | Stam | 382/108 |
| 6,456,289 | B1 * | 9/2002 | O'Brien et al. | 345/473 |
| 6,462,740 | B1 * | 10/2002 | Immel | 345/473 |
| 2003/0169253 | A1 * | 9/2003 | Kim | 345/419 |
| 2004/0108999 | A1 * | 6/2004 | Martin | 345/423 |
| 2005/0151733 | A1 * | 7/2005 | Sander et al. | 345/423 |

* cited by examiner

*Primary Examiner* — Said Broome
(74) *Attorney, Agent, or Firm* — Browdy and Neimark, PLLC

(57) ABSTRACT

The present invention provides a novel remeshing approach for genus-g meshes that overcomes distortion problems. The proposed approach is based on continuous mapping of a 2D grid on the 3D meshed model. The criteria of the new mesh can be defined directly on the 2D grid. The remeshing is invariant to the original mesh. Due to topological analysis, the mapping of the 2D grid onto the 3D mesh minimizes distortion and guarantees continuity. The 2D grid, the element shapes and the density (multiresolution) can be changed straightforwardly, thus generating a modular approach.

22 Claims, 14 Drawing Sheets

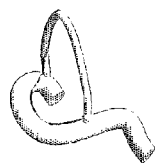     
Fig. 8A  Fig. 8B  Fig. 8C  Fig. 8D  Fig. 8E  Fig. 8F
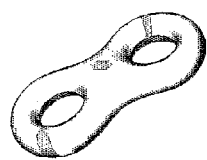 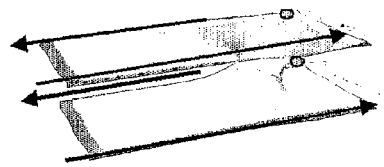 
Fig. 9A  Fig. 9B  Fig. 9C
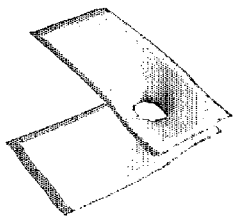 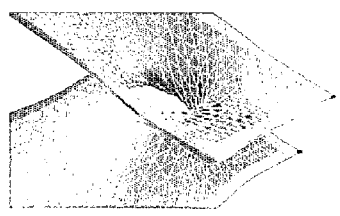 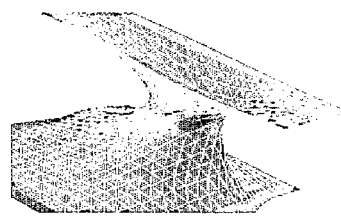
Fig. 10A  Fig. 10B  Fig. 10C

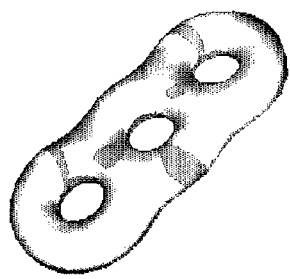 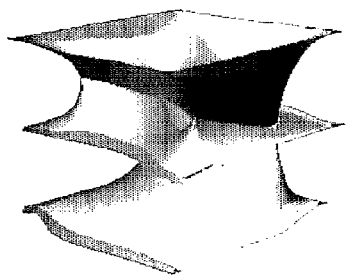 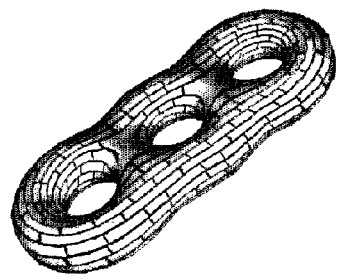
Fig. 13A       Fig. 13B       Fig. 13C
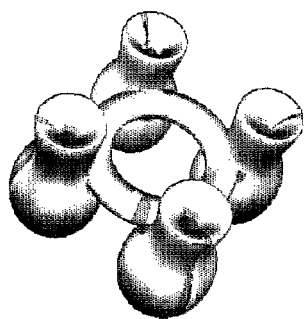 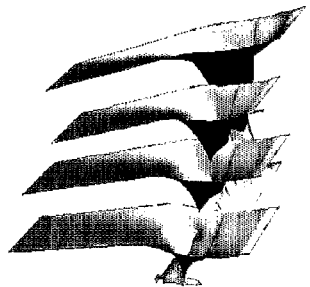 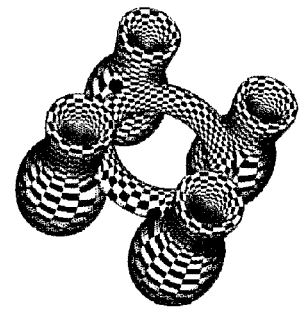
Fig. 14A       Fig. 14B       Fig. 14C

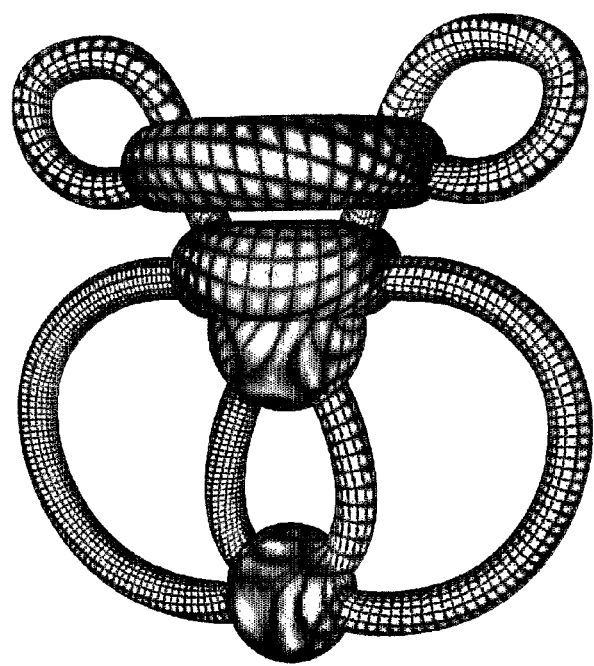
Fig. 15
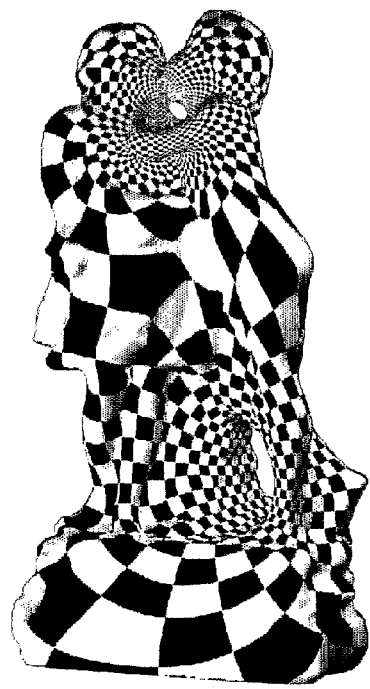      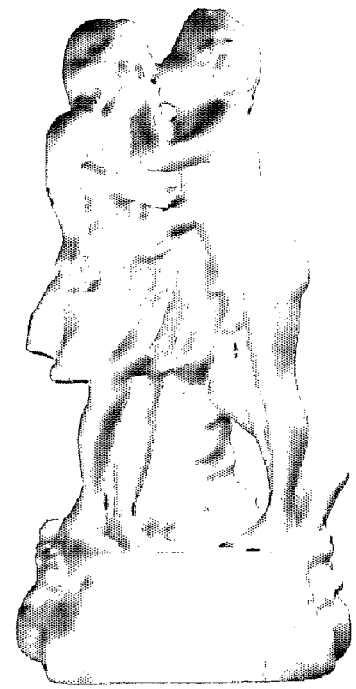
Fig. 16A                    Fig. 16B

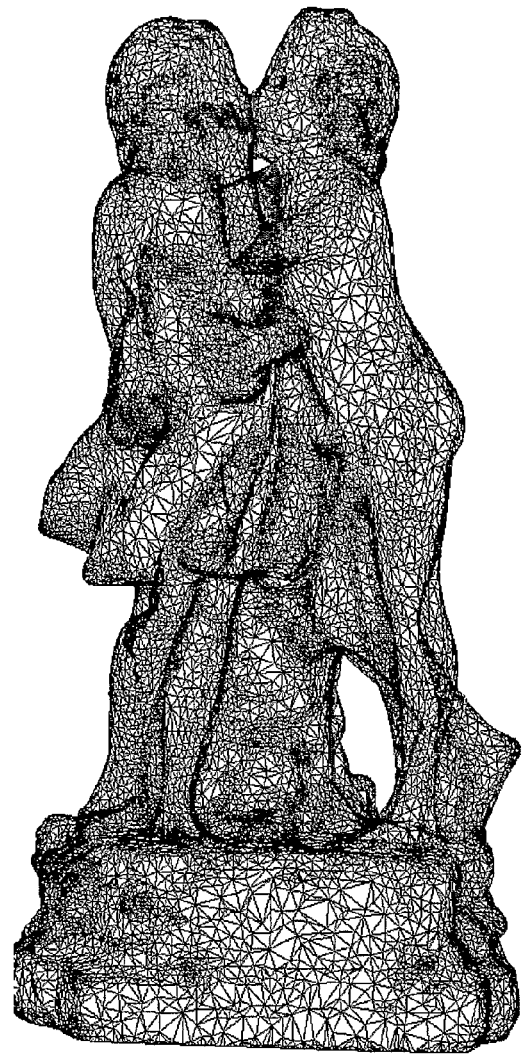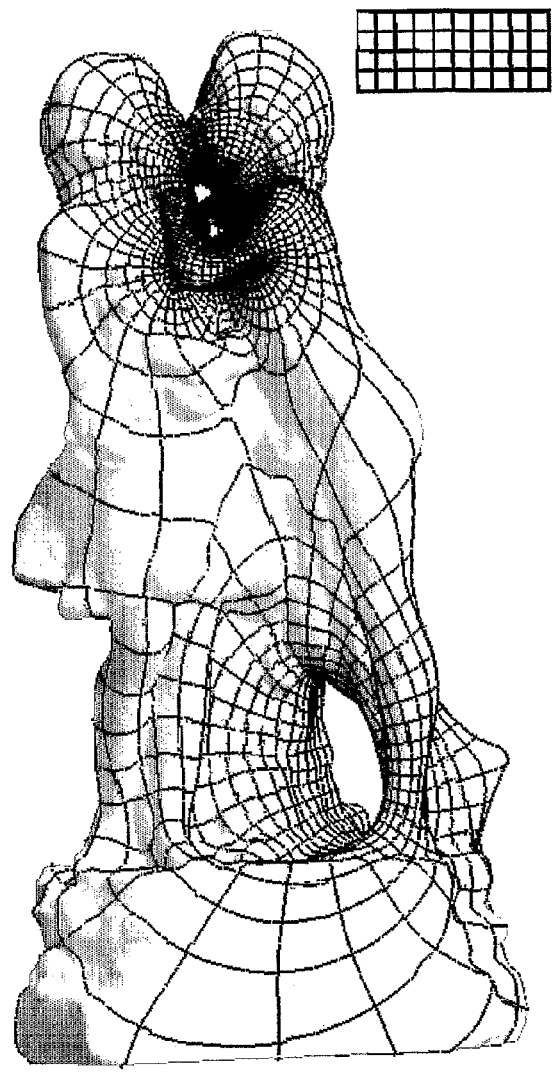
Fig. 20A                    Fig. 20B

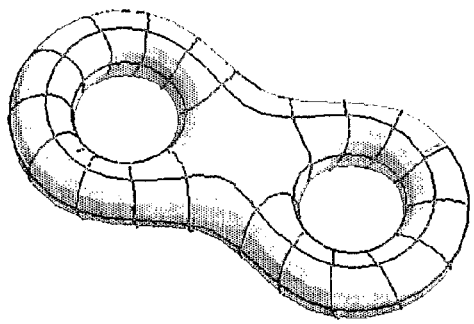
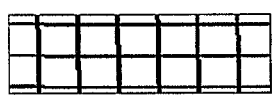
Fig. 21A
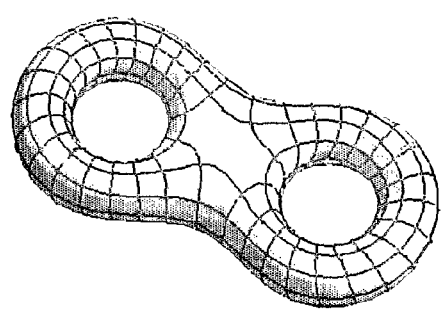
Fig. 21B
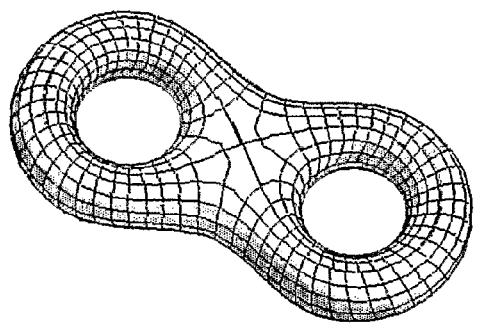
Fig. 21C
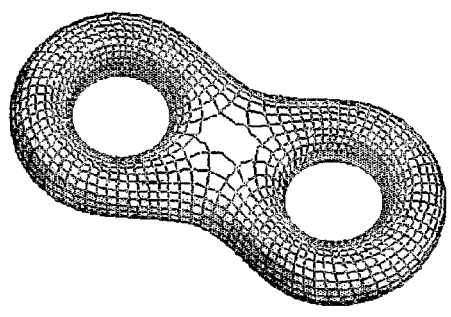
Fig. 21D
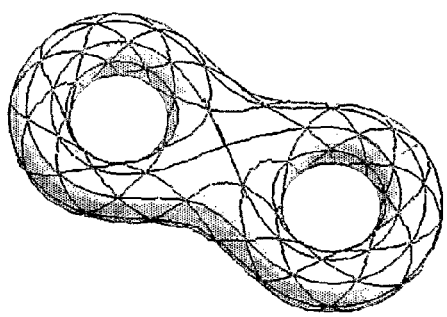
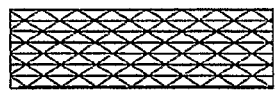
Fig. 21E
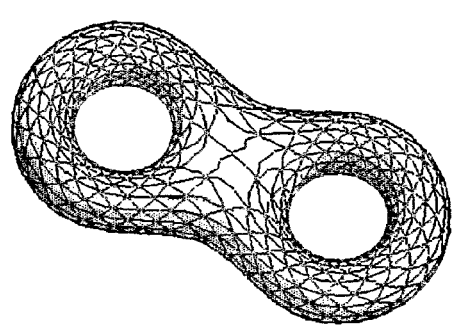
Fig. 21F

AUTOMATIC REMESHING BY MAPPING A 2D GRID ON 3D GENUS-G MESHES BASED ON TOPOLOGICAL ANALYSIS

FIELD OF THE INVENTION

The present invention relates to a method and apparatus for remeshing of 3D models, based on continuously mapping a 2D grid on the 3D genus-g meshed model. The invention is particularly relevant for applications in Computer-Aided Design, visualization and analysis.

BACKGROUND OF THE INVENTION

Surfaces are important in research disciplines like Computer-Aided Design (CAD), Computer-Aided Engineering (CAE), Computational Geometry and Computer Graphics.

Computer-Aided Design is the modeling of physical systems on computers, allowing both interactive and automatic analysis of design variants, and the expression of designs in a form suitable for manufacturing. It results from the development of a wide range of computer-based tools assisting in the design and creation of products and goods. These computerized tools help, amongst others, engineers and architects in their design and modeling activities of detailed two- or three-dimensional models of physical objects, such as mechanical parts, buildings, and molecules. In Computer-Aided Design, the focus lies on construction and design of curves and surfaces.

Computer-Aided Engineering (CAE) analysis is the application of computer software in engineering to analyze the robustness and performance of components and assemblies of mechanical parts. It encompasses analysis and manufacturing simulation, validation and optimization of products and are considered as computerized manufacturing tools.

Computational Geometry is the study of (computer) algorithms to solve problems stated in terms of geometry. Computational geometry has recently expanded its scope to include curves and surfaces.

Computer Graphics is the research field dedicated to visualization, where one utilizes computers both to generate visual images and to alter visual and spatial information sampled from the real world. Emphasis lies on visualization and output of surfaces.

Irrespective of the purpose for which the surface is used, a computer system requires a suitable representation of the surface. A surface representation is the formulation of a surface such that a human is able to reason about the surface with the aid of a computer and to apply queries on the surfaces according to the application requirements. Many representations have been proposed each with different advantages and disadvantages. Conversions between representations are needed in order to be able to use the advantages of different representations in the same application. For instance, piecewise linear approximations in the form of meshes are regularly used for visualization and further geometric processing. Often it is not possible to give a representation that defines the same surface as the original surface; in such cases, the surface is approximated.

Meshing is an essential representation for 3D general geometric models. Meshing is a software technique for dividing a 2D/3D shape into a set of elementary elements, commonly in the form of triangular or quadrilateral elements.

Meshing is an integral part of the CAE analysis process. The mesh influences the accuracy, convergence and speed of the solution. More importantly, the time it takes to create a mesh model is often a significant portion of the time it takes to get results from a CAE solution. Therefore, the better and more automated and accurate the meshing tools, the better the solution.

Meshing has received a great deal of attention from researchers in a variety of fields, ranging from CDA through numerical analysis to Computational Geometry. A high quality mesh is required for visualization, modeling, numerical analysis and manufacturing. The quality of a mesh is measured by the properties of its elements, i.e., triangles or quads, which should be as regular as possible. That is, the shape, angles or size of these elements must satisfy certain geometrical and mechanical physical criteria. Current meshing methods are applied on 3D genus-g objects. Curvature is the main geometrical criterion. However, size and the part dimensions are also used as geometric criteria.

The results, however, are not satisfactory, so that a remeshing is needed. In most cases, local meshing operations such as 3D edge splitting and merging are performed on the original mesh. Moreover, remeshing by replacing the original mesh elements with other new elements that differ in size and shape can be a difficult task and cannot be applied modularly. That is, changing one of the criteria leads to reactivating the remeshing process from scratch. In addition, the remeshed model is highly dependent on the connectivity of the original mesh and therefore cannot optimize the mesh significantly. In many cases, the original mesh is often highly irregular and non-uniform.

To overcome the above problems, recently researchers have applied mesh mapping from the 3D object domain to the parameterization domain, subsequently remeshing and then mapping back from the parameterization domain into the 3D object domain. For this, a plane is usually used as the simple parameterization domain of a rectangular plane to which the original mesh is mapped and remeshed. Then, the new mesh is mapped from the plane to the 3D object. In most cases, a one-boundary of the closed genus-g object is created and mapped to the boundary of the parameterization plane. Then, the internal mesh vertices are mapped to the plane with respect to the boundary location. Usually, remeshing is applied in the parameterization domain iteratively, using algorithms such as Voronoi diagrams (see Du et al., "Centroidal voronoi tesselation", Applications and algorithms. SIAM review, 41(4):637-676, 1999) until a desired 2D mesh is achieved. The main problems with these common remeshing approaches are as follows: (a) the remeshing process can be used efficiently only on genus-0 meshes, and (b) replacing the elements, for example from triangles to quads, is not trivial. Therefore, a new approach is required to overcome the above problems.

Parameterization methods have been developed for remeshing but they all present some problems. Until now, research studies have primarily considered planar parameterization with fixed boundaries. For closed meshes that have been cut and flattened, however, planar parameterization suffers from large distortions, especially on meshes whose original genus is greater than zero. The flattening process usually involves a preliminary cutting operation that results in a 1-boundary mesh. Much research has been devoted to finding a cut graph for genus-g class meshes. A cut graph is a connected graph containing 2g loops that are also called generators, where g is the genus. Cutting a genus-g mesh according to a cut graph yields a 1-boundary mesh that is homeomorphic to a disk. This 1-boundary mesh can then be flattened using any planar parameterization method. The parameterization resulting from the above procedure has large distortions, especially near the boundaries. Methods have been disclosed (see Cohen-Or et al., "Bounded-distortion piecewise mesh parameterization", IEEE Visualization, pp. 355-362, 2002); Desbrun et al., "Intrinsic Parameterizations of Surface Meshes", Computer Graphics Forum, 21(3), pp. 210-218, 2002; Sheffer et al., "Parameterization of Faceted Surfaces for Meshing Using Angle Based Flattening", Engineering with Computers, 17(30, pp. 326-337, 2001; Yoshizawa et al., "A fast and simple stretch-minimizing mesh parameterization", Intl. Conf. On Shape Modeling and Applications, pp. 200-208, June 2004) that can be used to cope with large distortions near the boundaries in high genus objects that are presented as one-boundary surfaces, but in such cases the continuity of the parameterization along the boundary cannot be controlled, nor can the characteristics of the mesh to be preserved. To cope with distortion from cutting the mesh and fixing its boundary, some studies have considered spherical parameterization for genus-0 objects. Gotsman (Gotsman et al., "Fundamentals of Spheric Parameterizations for 3D Meshes", ACM Trans. on Graphics, 22, 2003) teaches that any positive weights for genus-0 meshes can be used. The result is a spherical parameterization, and the solution is achieved by solving a non-linear system. To reduce distortion, Gu and Yau ("Global Conformal Surface Parameterization", SGP, pp. 127-137, 2003) have offered a solution for the open problem of conformal parameterization for manifold genus-g meshes. Although different weights can be used over the edges, these weights must be symmetric. That is, in the case of an edge $e_{ij}$ with a weight $k_{ij}$, $k_{ij}$ must be equal to $k_{ji}$. Thus, neither the mean-value weights nor the shape-preserving weights can be used, nor can any other non-symmetric weight. Furthermore, in Gu and Yau (2003), harmonic weights are used, so that meshes with obtuse angles cannot be handled because such angles will cause the harmonic weights to be negative, in which case the process will converge more slowly and the triangles may overlap. Therefore, if the mesh includes triangles with obtuse angles, it should be remeshed without obtuse angles.

In summary, remeshing of 3D models is important for many CAD, visualization and analysis applications. Current remeshing methods for closed manifold gene-g meshes usually involve 3D mesh operations such as splitting and merfing the mesg edges in order to construct a new mesh that will satisfy given geometrical criteria. These 3D operations are local and usually do not lead to the desired new mesh. Indeed, the remeshed model usually does not satisfy regular criteria. Moreover, changing one of the criteria will not lead to reactivating the remeshing process from scratch.

There is a need in the art for novel remeshing approaches that will overcome the above problems.

SUMMARY OF THE INVENTION

The present invention relates to a novel remeshing approach based on continuously mapping a 2D grid on the 3D genus-g meshed model. The criteria of the new mesh can be defined directly on the 2D grid by selecting a 2D image pattern from a catalogue or defining the 2D pattern parametrically. The remeshing is invariant to the original mesh. The mapping is based on a preferred parameterization technique, which utilizes the topologic analysis of the object. As a result, the mapping of the 2D grid into a 3D mesh minimizes distortion and guarantees continuity. In addition, the 2D grid, the element shapes and the density can be modified straightforwardly, thus leading to a modular and flexible approach.

The present invention thus concerns a remeshing method of a three-dimensional (3D) meshed model by mapping a two-dimensional (2D) grid to said three-dimensional meshed model, the method comprising the steps of:

(i) constructing a parameterization surface of said three-dimensional meshed model;

(ii) mapping the resulted parameterization surface of the three-dimensional meshed model to said two-dimensional grid;

(iii) mapping each node of the two-dimensional grid to the three-dimensional meshed model;

(iv) connecting the nodes on the three-dimensional meshed model according to connectivity relations which are defined by the two-dimensional grid edges; and (v) connecting the new edges on the three-dimensional meshed model via the crossing points, thus defining the new three-dimensional meshed model.

The invention is particularly relevant when the 3D meshed model is a 3D closed manifold genus-g meshed model and g is greater then zero. In other words, the invention relates to remeshing of 3D shapes containing one or more holes.

The first step concerns "cutting" the 3D model in order to flatten it out to a 2D model. The "cutting" step, that is constructing a parameterization surface of the 3D meshed model, is not limited to a particular parameterization technique. It is understood that the scope of the invention includes using any parameterization technique. The quality and nature of the parameterization technique used influences the quality and characteristics of the remeshing process of the invention. One effective parameterization technique described herein is based on understanding utilizing the topology of 3D genus-n objects. This parameterization technique is based on finding the generators of the object and identifying their type (longitudes and meridians). The object is parameterized to n parallel planes, so that each hole is mapped to one of the planes, by means of the generators. The overall mapping generates a 3D surface over n planes. This surface can be represented on the global XY plane.

For the purpose of remeshing, a 2D grid is defined on the global plane. This 2D grid can be composed of any type of elements in any dense, typically triangles or quads, though any other type of element can be used. The elements can have any geometrical feature, for example equiangular, equilateral etc.

The 2D grid serves as a basis for the new mesh created on the 3D object. First, each node on the 2D grid is mapped to the original 3D mesh, according to the parametric coordinates. After all of the nodes have been mapped comes the connectivity stage, in which the paths between the nodes are calculated. The nodes on the parameterization surface are connected according to neighbor considerations on the paths, which are defined by the two-dimensional grid. Because there is an unequivocal relationship (one to one mapping) between the 3D object and its parameterization surface, in essence a 3D mesh is built on the object.

The density of the mesh or the type of elements can be changed by directly changing the parameters of the 2D grid. Moreover, according to different criteria such as curvature, the density of certain elements can be modified. This process can be considered as adaptive meshing.

BRIEF DESCRIPTION OF THE DRAWINGS

FIGS. 8a-8f illustrates loops: 8a is a loop with its two generators; 8b is a loop, zooming on a problematic area with obtuse angles; 8c illustrates texture mapping using harmonic weights; 8d illustrates texture mapping using mean-value weights; 8e illustrates parameterization space using harmonic weights; and 8f illustrates parameterization space using mean-value weights.

FIGS. 9a-9c show a genus-2 object: 9a shows 8 generators left side (yellow), meridian right side (red), longitude right side (green) and singular points area (purple); 9b shows oriented generators above one another, crossing vertex (red); and 9c shows zoomed crossing area.

FIGS. 10a-10c illustrates flipping between meridian & longitude: 10a illustrates resulting twisted parameterization, while 10b and 10c illustrate zoomed twisted area.

FIGS. 13a-13c show a bagel with three holes: 13a shows the object with generators and singular points (purple); 13b shows the parameterization surface lifted (stretched in the Z direction for viewing purpose); and 13c shows the resulting texture mapping.

FIGS. 14a-14c illustrate a four torus-like vases attached to a torus: 14a shows the object with generators and singular points (purple); 14b shows the parameterization surface lifted (stretched in the Z direction for viewing purpose); and 14c shows the resulting texture mapping.

FIG. 15 shows the resulting texture mapping of a genus-7 object parameterization.

FIGS. 16a-16b illustrate a genus-3 object parameterization: 16a is the original object, and 16b is the resulting texture mapping.

FIGS. 20a-20b show a scanned sculpture (genus-3): 20a shows the original mesh with pair of generators, and 20b shows it remeshed by quads.

FIGS. 21a-21f show a figure eight shape in multi-resolution and multi0element using the same parameterization space: 21a-21b show quads elements low resolution; 21c-21d show quads elements high resolution; 21e shows triangular elements low resolution; and 21f shows triangular elements high resolution.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to a remeshing method and a system for the implementation of the method, which is based on mapping a 2D grid on the 3D meshed model. The criteria or elements of the new mesh can be defined directly on the 2D grid. With a parameterization approach that utilizes the topological analysis, the remeshing is invariant to the original mesh and therefore does not deform the original mesh. Mapping the 2D grid onto the 3D mesh minimizes distortion of the 2D elements and guarantee continuity. The 2D grid, the element shapes and the density can be changed straightforwardly, leading to a modular approach.

Figure 1:
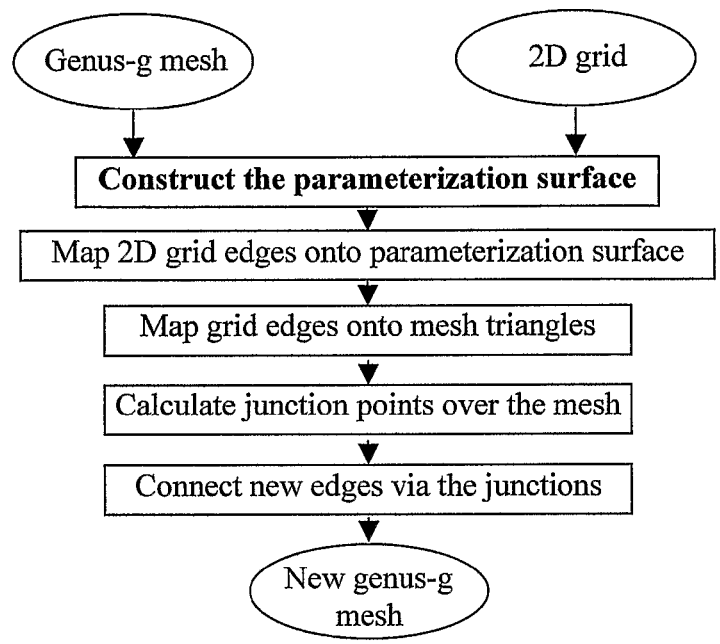
FIG. 1 is a flow diagram illustrating the remeshing process of the invention.

FIG. 1 is a diagram describing the remeshing method of the invention. The input is a 3D closed manifold genus-g mesh and a 2D grid. The stages are: a) parameterization of the mesh, for example according to FIG. 2; b) mapping the 2D grid on the parameterization surface; c) defining the 2D grid region for each mesh triangle; d) calculating grid crossing points (junctions) over the 3D mesh; and e) connecting the new edges via the crossing points (junctions) and defining the new mesh.

The present invention thus provides a remeshing method of a three-dimensional meshed model by mapping a two-dimensional grid to said three-dimensional meshed model, the method comprising the steps of:

(i) constructing a parameterization surface of said three-dimensional meshed model;

(ii) mapping the resulted parameterization surface of the three-dimensional meshed model to said two-dimensional grid;

(iii) mapping each node of the two-dimensional grid to the three-dimensional meshed model;

(iv) connecting the nodes on the three-dimensional meshed model according to connectivity relations which are defined by the two-dimensional grid edges; and (v) connecting the new edges on the three-dimensional meshed model via the crossing points and by that defining the new three-dimensional meshed model.

The invention is particularly relevant when the three-dimensional meshed model is a three-dimensional closed manifold genus-g meshed model and g is greater then zero. In other words, the invention relates to remeshing of three-dimensional shapes containing one or more holes.

Figure 2:
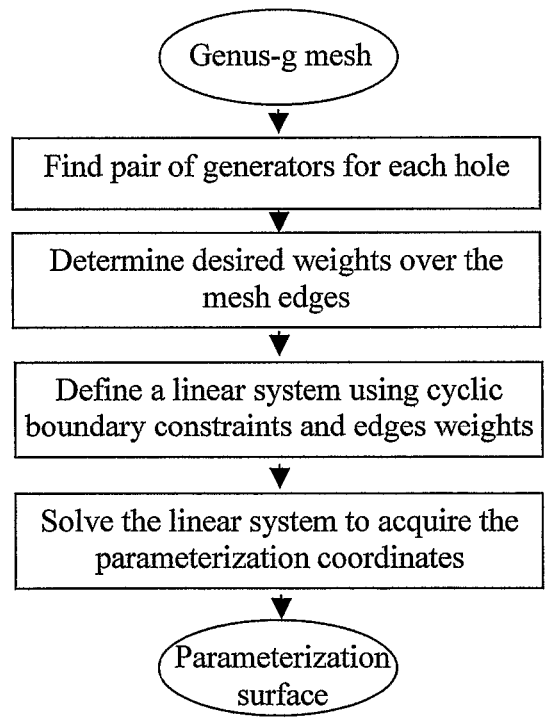
FIG. 2 is a flow diagram of the preferred parameterization process used in the remeshing process of the invention.

The mapping has the above advantages due to a parameterization technique, previously developed by the inventors, which utilizes the topological analysis. FIG. 2 is a diagram describing the stages of the parameterization process. The stages are: a) find a pair of generators for each hole (a longitude and a meridian); b) determine the desired weights over the mesh edges; c) define the linear system using cyclic boundary constraints and edges weights; and d) solve the linear system to acquire the parameterization coordinates.

One effective parameterization technique for construction of the resulted parameterization surface that is superior to current parameterization methods was previously developed by the inventors and is based on the following steps:

(i) finding a pair of generators for each hole of said three-dimensional meshed model;

(ii) determining the desired weights over the edges of the three-dimensional meshed model;

(iii) defining a linear system using cyclic boundary constraints and edges weights; and (iv) calculating the parameterization surface by solving the linear system and finding the parameterization coordinates of the three-dimensional meshed model.

1. Global Parameterization of Genus-G Meshes

The parameterization technique described below in section 1.1 uses a new bijective parameterization method for genus-1 objects, based on planar barycentric coordinates method and using cyclic boundary constraints. The, in section 1.2 a generalization of the method for parameterization of genus-g meshes is described. The first part of the process focuses on flattening genus-1 objects onto a plane using any combination of barycentric weights (see Appendix B hereinafter), while reducing the distortions over the boundaries and preserving parameterization continuity. A correctness proof of the method is provided. The proposed method can be solved using the Gauss-Seidel procedure. Then, it is extended to genus-g parameterization, based on our proposed method for genus-1 objects and our previous work (Steiner and Fischer, "Explicit Representation of Object Holes in Topological and Cut Graphs", Proceedings of the 4$^{th}$ Israel-Korea Bi-National Conference, Tel-Aviv, Israel, pp. 40-44, February 2003, herewith incorporated by reference in its entirety as if fully disclosed herein) that finds the generators of genus-g objects (also briefly presented in Appendix A hereinafter). These generators can also be found by using an algebraic method, such as the boundary operator and the Smith-normal form. The parameterization method developed in Steiner, 2003 (see above) has been chosen here because it is faster and does not require mesh simplification. Moreover, as opposed to other methods, it finds and utilizes the generator type: meridian (the generator around the object) and longitude (the generator around the hole). Knowing and utilizing the type of each generator is essential for parameterization of genus-g objects.

1.1 Parameterization for Genus-1 Meshes

The planar parameterization for genus-1 meshes method is applied to a closed manifold genus-1 mesh and its two generators, such that the generators intersect only once. In most common methods, the mesh is usually cut according to the generators, and its boundary is then fixed to a convex polygon. In the proposed method of the invention, only one vertex is fixed, and the fixed boundary constraints are replaced by cyclic boundary constraints. Fixing one vertex ensures that $L_w$ is non-singular. Applying the cyclic boundary constraints ensures that the solution will not converge to the fixed vertex. The linear system can then be solved using the Gauss-Seidel procedure, where convergence is guaranteed for any initial guess of the vertex parameterization positions. The system of equations is given in Equation 1.

$$L_w X = b \quad (1)$$

The cyclic boundary constraints are defined in Section 1.1.1. Section 1.1.2 provides a proof that the fixed vertex causes at most one foldover, which can be handled straightforwardly. Section 1.1.3 presents implementation details, and Section 1.1.4 demonstrates the feasibility of the parameterization method through examples.

1.1.1 The Cyclic Boundary Constraints

As mentioned above, in the proposed algorithm the fixed boundary constraints are replaced by cyclic boundary constraints, thus preserving the continuity of the parameterization over the mesh boundaries. The directed generators are marked as a and b in FIG. 3. In order to define the cyclic boundary constraints, the method first traverses the generators and marks neighbor vertices of the generators as $N_g(a)$ and $N_g(b)$ accordingly. In addition, all neighbor vertices on the right side of the generators a, b are marked as $N_r(a)$ and $N_r(b)$ accordingly. During each iteration, the 2D parameterization coordinates of each vertex $v_i$, except the fixed vertex, are calculated as follows:

$$v_{i_x} = \sum_{j \in N(i)} \frac{W_{ij}(v_{j_x} + f_x(i,j))}{\sum_{j \in N(i)} W_{ij}} \quad (2)$$

$$v_{i_y} = \sum_{j \in N(i)} \frac{W_{ij}(v_{j_y} + f_y(i,j))}{\sum_{j \in N(i)} W_{ij}}$$

where $W_{ij}$ is a positive weight predefined for an edge $e_{ij}$. Without loss of generality, we define the boundaries of the parameterization plane, which also define the cycle of the cyclic boundary constraints, to be $[-\pi:\pi] \times [-\pi:\pi]$. Then, $f_x$ and $f_y$ are defined in Equation 3.

$$f_x(i,j) = \begin{cases} 2\pi & v_i \in a \wedge v_j \in Nr(a) \\ -2\pi & v_i \in Nr(a) \wedge v_j \in a \\ 0 & \text{Otherwise} \end{cases} \quad (3)$$

$$f_y(i,j) = \begin{cases} 2\pi & v_i \in b \wedge v_j \in Nr(b) \\ -2\pi & v_i \in Nr(b) \wedge v_j \in b \\ 0 & \text{Otherwise} \end{cases}$$

where $w_{ij}$ is defined as:

$$w_{ij} = \frac{W_{ij}}{\sum_{j \in N(i)} W_{ij}} \quad (4)$$

Therefore, $v_{i_x}$ is given as:

$$v_{i_x} = \sum_{j \in N(i)} (w_{ij} v_{j_x} + w_{ij} f_x(i, j)) \quad (5)$$

Then:

$$v_{i_x} = \sum_{j \in N(i)} w_{ij} v_{j_x} + \sum_{j \in N(i)} w_{ij} f_x(i, j) \quad (6)$$

and finally:

$$v_{i_x} - \sum_{j \in N(i)} w_{ij} v_{j_x} = \sum_{j \in N(i)} w_{ij} f_x(i, j) \quad (7)$$

The same process is similarly applied on $v_{i_y}$:

$$v_{i_y} - \sum_{j \in N(i)} w_{ij} v_{j_y} = \sum_{j \in N(i)} w_{ij} f_y(i, j) \quad (8)$$

Equations 7-8 take the form of Equation 1. Since mesh connectivity does not change during the process, the right side of Equations 7-8 is a constant and defines the cyclic boundary constraints b. $L_w$ is defined by the left side of Equations 7-8, as follows:

$$L_W(i, j) = \begin{cases} -w_{ij} & \forall i \neq j : e_{ij} \in M \\ 0 & \forall i \neq j : e_{ij} \notin M \\ 1 & i = j \end{cases} \quad (9)$$

where M is the mesh.

Figure 3:
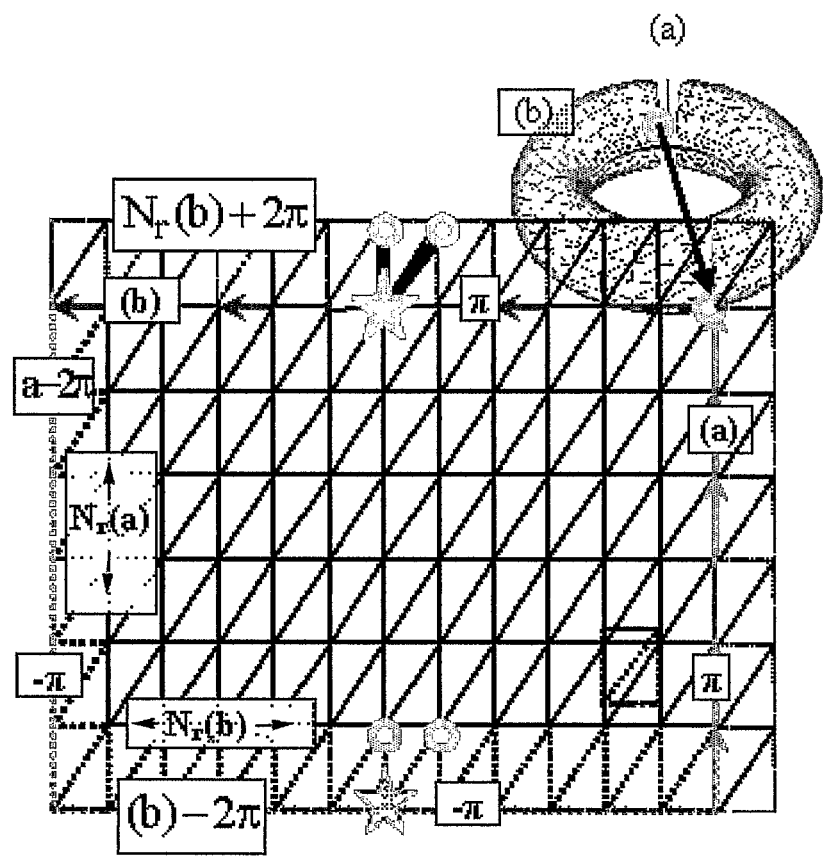
FIG. 3 is an illustration of Equation (3). Vertices on the longitude are marked by stars and longitude-right-neighbors are marked by circles.

Without loss of generality, the generators crossing vertex is fixed at the top-right corner of the parameterization plane (in our case $(\pi, \pi)$, as can be seen in FIG. 3), making $L_w$ non-singular. As a result of applying the cyclic boundary constraints, the continuity is preserved in between the longitude boundaries and in between the meridian boundaries. The cyclic boundary property is illustrated in FIG. 3. Vertices on the longitude (b) (marked by stars) are translated $-2\pi$ units in the y direction in the parameterization plane. Thus, they become the neighbors of $N_r(b)$. Similarly, vertices on $N_r(b)$ (marked as circles) are translated $2\pi$ units in the y direction, thus becoming neighbors of (b).

1.1.2 Parameterization without Foldovers

The cyclic boundary constraints were defined in the previous section. In this section a proof is given that the fixed vertex, $v_{fix}$ causes at most one foldover. Based upon the definition of the $L_w$ matrix, which is non-singular and diagonal-dominated, the Gauss-Seidel method converges. According to Equation 2, all vertices except $v_{fix}$, are equal to the weighted average of their neighboring vertices. Based on the above, the next subsection, offers a proof that, with the exception of $v_{fix}$ and its neighbor vertices, no vertices can cause Holdovers. Then we relates to $v_{fix}$ and its neighbors, offering a solution once folding occurs.

1.1.2.1 Vertices without Foldovers

Figure 4:
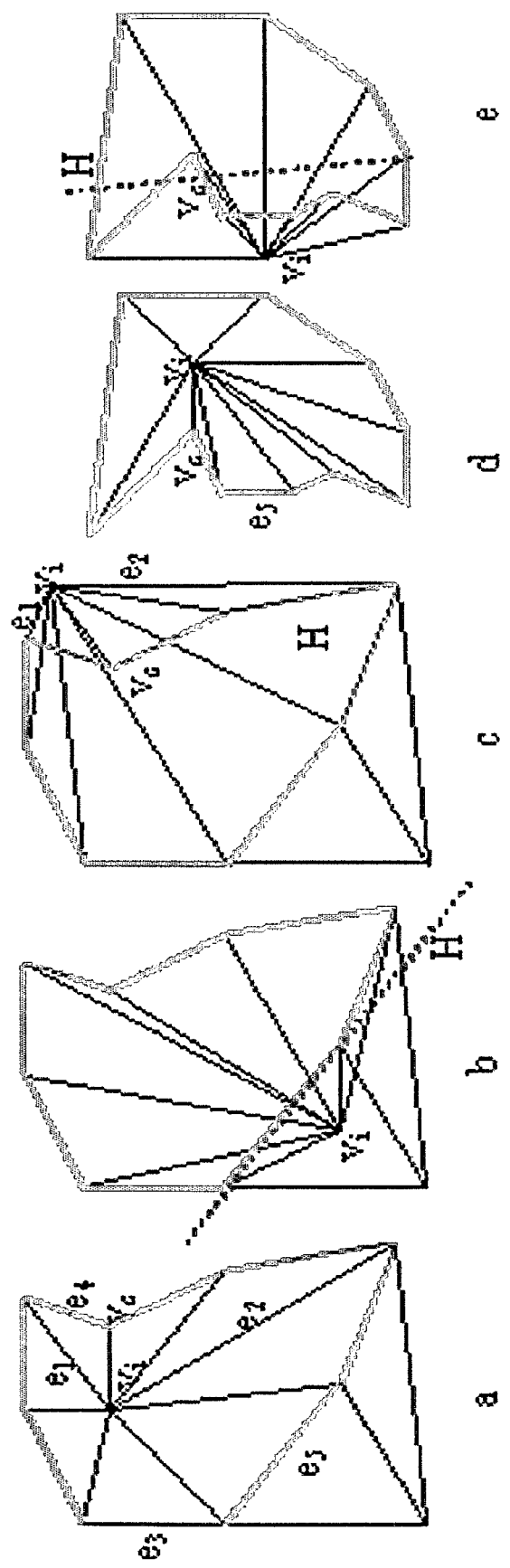
FIGS. 4a-4e depict different edge states: 4a shows the boundary of the fan around $v_i$; 4b illustrates penetrating a convex-hull edge; 4c illustrates penetrating an edge with concave vertex; 4d illustrates a boundary of a fan with convex region which is not on the convex-hull; and 4e illustrates penetrating an edge of a convex region which is not on the convex-hull.

As indicated previously, this section considers all vertices except $v_{fix}$ and its neighbors (its fan). All edges on the boundary of the fan of vertex $v_i$ can be classified into three classes: Edge-A, Edge-B, Edge-C. Class Edge-A contains all the edges located on the convex hull (i.e., FIG. 4a, edge e3); class Edge-B contains all the edges that have at least one concave vertex $v_c$ at their ends (i.e., FIG. 4a, edge e4); class Edge-C contains all the edges that have two convex vertices at their ends but are not on the convex hull (i.e., FIG. 4d, edge e5). The above classification can be used to show that there cannot be any foldover. Each of the following possible foldover cases contradicts the assumption that all weights $w_{ij}$ are positive and that each vertex $v_i$ is equal to the weighted average of its neighbor coordinates:

a) $v_i$ creates a foldover through an edge belonging to class Edge-A (FIG. 4b). The penetrated edge defines a straight line, which is a hyperplane H (FIG. 4b), dividing the plane into two sides. One side of H contains all the neighbors of $v_i$, while $v_i$ is on the other side, thus contradicting the above assumption.

b) $v_i$ penetrates an edge of class Edge-B (FIG. 4c). A hyperplane H can be found such that all neighbors of $v_c$ are placed on one side and $v_c$ is on the other side (FIG. 4c), thus contradicting the above assumption.

c) $v_i$ penetrates an edge of class Edge-C. A concave vertex $v_c$ (FIG. 4d) must be found on the fan as well as a hyperplane H such that all neighbors of $v_c$ are placed on one side and $v_c$ is on its other side (FIG. 4e), thus contradicting the above assumption.

Hence, Holdovers cannot occur.

1.1.2.2 Foldovers from Fixed Vertex and Neighbor Vertices

Figure 5:
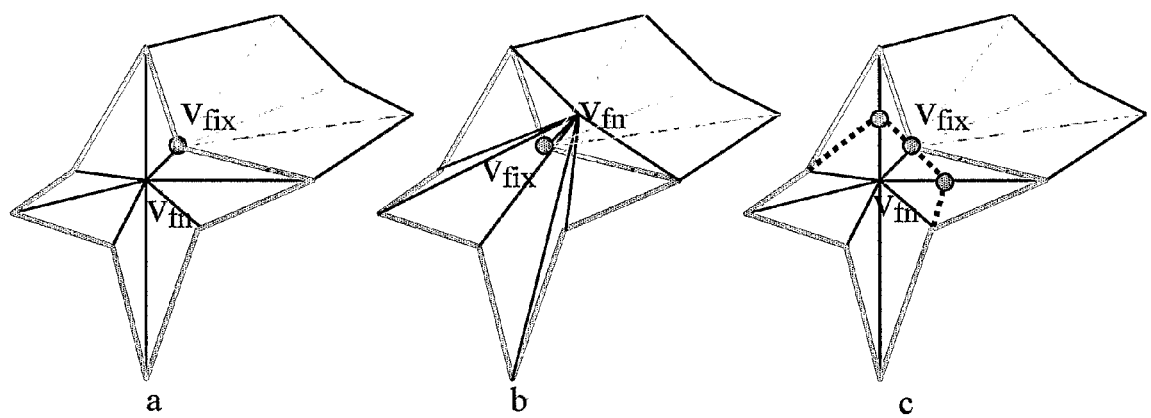
FIGS. 5a-5c illustrates Holdovers from fixed vertex and neighbor vertices, the fixed vertex is marked $v_{fix}$, while the neighboring vertex of $v_{fix}$ is be referred to as $v_{fn}$: 5a shows $v_{fix}$ on a concave region of the fan boundary, 5b illustrates penetrating an edge belongs to $v_{fix}$; and 5c illustrates subdivision of $v_{fix}$ fan.

This section deals with the fixed vertex $v_{fix}$. A neighboring vertex of $v_{fix}$ will be referred to as $v_{fn}$ (FIG. 5). As shown in Section 1.1.2.1, if the fan of a vertex $v_i$ does not contain $v_{fix}$, $v_i$ cannot penetrate its fan. Thus, the only possible way for foldover to occur is if there is a concave angle on $v_{fn}$ fan that includes $v_{fix}$, as seen in FIG. 5a. The following considers two states for the angles around $v_{fix}$: (a) $v_{fix}$ forms a convex angle on the fan of $v_{fn}$ and (b) $v_{fix}$ forms a concave angle on the fan of $v_{fn}$. In case (a), the edges connected to $v_{fix}$ form a convex region, and as proven in section 1.1.2 $v_{fix}$ cannot cause Holdovers. In case (b), the resulting weighted average for $v_{fn}$ can be outside the region of its fan, as seen in FIG. 5b. Because $v_{fix}$ is fixed, a foldover might occur that satisfies the solution of the linear equation (FIG. 5b). Thus, if $v_{fix}$ forms an obtuse angle, foldover may occur. In practice, foldover did not occur on the flattened models tested by us using cyclic boundary constraints. A simple solution that solves the foldover problem is to subdivide the two overlapping triangles connected to $v_{fix}$, as shown in FIG. 5c. Further details for the foldover solution are given in Section 1.1.3.

1.1.3 Implementation for Genus-1 Meshes

This section discusses the implementation of the proposed method of the invention for genus-1 meshes. The implementation complexity is similar to the complexity of the process of flattening a mesh with a fixed boundary bounded by $O(n^2)$. The implementation steps are as follows:

a) Determine the fixed vertex $v_{fix}$.

b) Mark all vertices on the right side of the generators a, b as Nr(a), Nr(b) accordingly.

c) Calculate a positive weight $w_{ij}$ for each edge $e_{ij}$.
d) Initiate vertex coordinates as follows:

$$v_{ix} = \begin{cases} \pi & v_i \in a \\ \left[\pi : \frac{2\pi}{|b|} : -\pi \right] & v_i \in b \\ 0 & \text{Otherwise} \end{cases}$$

$$v_{iy} = \begin{cases} \pi & v_i \in b \\ \left[\pi : \frac{2\pi}{|a|} : -\pi \right] & v_i \in a \\ 0 & \text{Otherwise} \end{cases}$$

e) Calculate the coordinate position of each vertex $v_i$ except the fixed vertex $v_{fix}$ using Equation 2.

The following sub-sections explained how to fix the crossing vertex and how to handle the only foldover that might occur.

1.1.3.1 Fixing the Crossing Vertex

As noted previously, the crossing vertex belongs to both generators. The crossing vertex in the coefficient matrix, $L_w$ is set as follows:

$$L_w(i_{fix}, j) = \begin{cases} 0 & j \neq i_{fix} \\ 1 & j = i_{fix} \end{cases} \quad (10)$$

where $i_{fix}$ is the fixed vertex index.

1.1.3.2. Handling a Foldover

As shown in Section 1.1.2.2, if $v_{fix}$ forms a concave angle around the fan boundary of one of its neighbors, $v_{fn}$, a foldover could theoretically occur. In practice, this did not happen on the tested models. A simple solution is to subdivide the two overlapping triangles connected to $v_{fix}$, as shown in FIG. 5c. Following is the algorithm for handling the foldover problem:

a) When the iterative process converges, find flipped faces belonging to the fixed vertex, $v_{fix}$.
b) If there is no flipped face, terminate.
c) Subdivide the two flipped faces and eliminate the concave angles around $v_{fix}$. Due to the subdivision, two additional vertices are added to the mesh.
d) Start the iteration process using the current resulting V as an initial guess.
e) Go to (a).

1.1.4 Examples for Genus-1 Objects

Figure 7A:
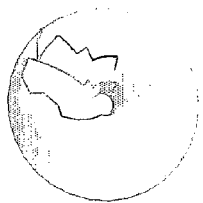
FIGS. 7a-7d illustrate a Torus parameterization: 7a shows a torus and its two generators; 7b shows texture mapping using harmonic weights with fixed boundary; 7c shows parameterization space when using fixed boundary; 7a shows texture mapping using harmonic weights with cyclic boundary; and 7e shows a parameterization space when using cyclic boundary.
Figure 7B:
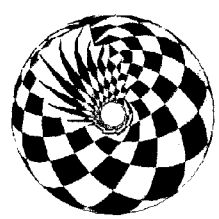
Figure 7C:
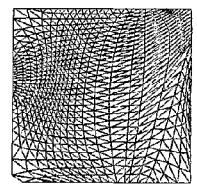
Figure 7D:
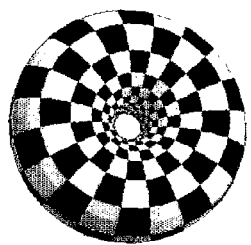
Figure 7E:
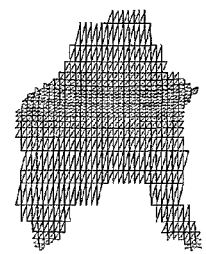
Figure 11A:
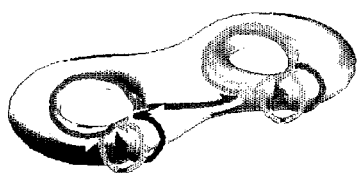
FIGS. 11a-11i illustrate crossing point states: 11a shows an 8-shape, its generators and connecting path; 11b shows an outer circle: mapping to a plane and boundary directed edges, inner circle: stitching directions; 11c shows folding one-boundary surface into a cube without upper and lower face; 11d shows meridian to longitude crossing states; 11e illustrates flipping around meridian; 11f illustrates flipping around longitude; 11g illustrates longitude to meridian states; 11h illustrates flipping around diagonal; and 11i illustrates flipping around diagonal.
Figure 11B:
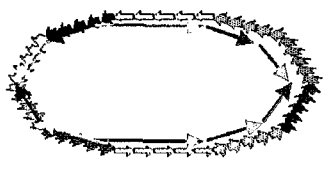
Figure 11C:
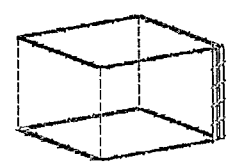
Figure 11D:
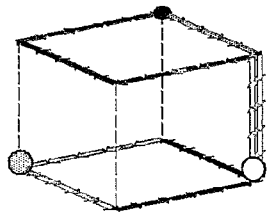
Figure 11E:
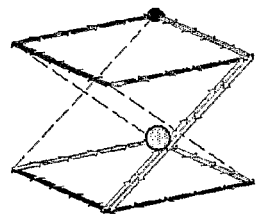
Figure 11F:
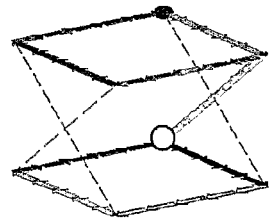
Figure 11G:
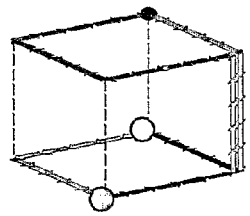
Figure 11H:
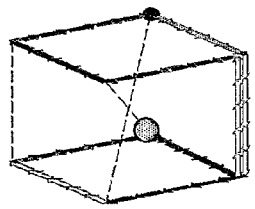
Figure 11I:
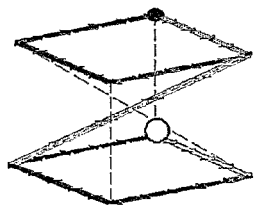

The examples of genus-1 objects clearly show that selection of the generators (FIG. 7) does not affect the angles preserved under the parameterization. FIG. 7 shows the difference between using a fixed boundary (FIG. 7b) and cyclic boundary constraints (FIG. 7d) on a torus with harmonic weights. The corresponding parameterization is given in FIG. 7c and FIG. 7e. The distortion near the generators when using the fixed boundary is clearly evident (FIG. 7b). FIG. 8 compares harmonic and mean-value weights on a loop model with a large number of obtuse angles.

1.2 Parameterization for Genus-g Meshes

In the previous section we described planar parameterization for genus-1 meshes. In this section we discuss the extension of planar parameterization for genus-g meshes. Note that the resulting parameterization function is not bijective. Gu and Yau ("Computing Conformal Structures of Surfaces", Communications in Information and Systems, 2, 2, pp. 121-146, 2002) proposed to flatten a genus-g mesh g times, each time selecting another pair of generators as the current boundary. Then, the boundary is fixed, and weights are addressed to each flattened edge. Next, all the parameterizations resulting from each generator-pair iteration are merged into one parameterization. The drawback of this method lies in the fact that the boundary is fixed, leading to distortion near the generators. The method proposed by Gu and Yau (2002) can be modified by using the cyclic boundary rather than the fixed boundary. Using the cyclic boundary solves the problem of distortion near the generators. Still, this parameterization process is applied g times, where g is the object genus. The study in Gu and Yau 2003 (cited hereinabove) overcomes the distortion problem, but in this case only symmetric weights can be used in the parameterization process.

According to the present invention, we propose a new method for flattening closed manifold genus-g objects. With the following embodiment, any type of positive weights can be used, whether symmetric or asymmetric. Section 1.2.1 offers a new insight leading to a process which is not dependent on the genus of the object. The time complexity proposed by Gu and Yau (2002) is O(g·m), where g is the genus and O(m) is the time complexity of the common barycentric coordinate flattening process using fixed boundary. O(m) is bounded by $O(n^2)$, where n is the number of vertices in the mesh. The time complexity of the proposed method (Section 1.2.1) does not depend on the genus of the object, so that the time complexity of our method is only O(m). The examples in Section 1.2.3 demonstrate the feasibility of the method on genus-g objects. Section 1.2.1 describes the relation between the g-planes of genus-g objects, and Section 1.2.2 describes in detail the implementation of the parameterization process for genus-g objects.

1.2.1 Relation Between Parameterization Planes

The parameterization of a genus-g object is calculated on the XY plane using Equation 3. The connectivity between the parameterized vertices is defined by the original mesh connectivity. By using vertices on the generators for defining cyclic boundary constraints of each hole, we can represent the parameterization plane as a 3D parameterization surface. This concept is explained in detail hereinbelow.

We mark the generator pair of each hole as $(a_i, b_i)$. If we cut the mesh along its all generator pairs $(a_i, b_i)$, we get an object that is homotopic to a sphere with g-boundaries, where g is the genus. A boundary created by the generator pair $(a_i, b_i)$ is marked as boundary$_i$. Now, we place the g-boundaries on g different parallel planes. The connectivity of the vertices in the 3D parameterization surface is defined by the mesh connectivity. Initially all boundaries are placed such that all longitudes are parallel to one another, and the same is applied for the meridians. Also, the mesh is defined by each of the boundaries in a counterclockwise direction when projected in the positive Z direction, and the crossing vertices are placed one above the other in the Z direction. Thus, we get a surface composed of connected g-planes in crossing relations. Note that in practice the parallel g-planes represent the parameterization plane. The planar parameterization is the projection of the surface on the XY plane.

The following discussion demonstrates the above concept on a genus-2 object. Boundaries created by cutting along genus-2 object generators are selected (FIGS. 10a, 10b, 10c). The generators are then oriented along the boundary such that by traversing them, the mesh will be always on the left side. Then, the generators are placed one over the other such that they are oriented in the same direction, and the crossing vertices between the meridians and the longitudes are placed one above the other. The result is a mesh with two boundaries that cross themselves (FIGS. 8b, 8d, 8e, 8f). The generators must be placed such that the longitudes and meridians of different boundaries are parallel. Also, all crossing vertices (between generators) should be placed one above the other (FIG. 9b); otherwise, the resulting mesh will not cross itself but only twist (FIG. 10). FIG. 11 shows a figure eight with its generators, giving all possible states between longitude and meridians. Clearly, if the order is not correct (that is, if the meridian and longitude are confused), the result is a twisted mesh instead of a crossed mesh. Hence, it is important to distinguish between the type of generators (meridian, longitude) described in Steiner and Fischer, 2003 (see above). The solution for parameterization coordinates is obtained simultaneously because all the cyclic constraints defined by all boundaries are included in the same linear system.

1.2.2 Implementation for Genus-g Meshes

The implementation complexity for the parameterization of genus-g objects is similar to the implementation complexity of genus-1 parameterization. The steps are:

a) calculate a positive weight $w_{ij}$ for each edge $e_{ij}$;
b) select a generator-crossing vertex from one of the holes and define it as the fixed vertex;
c) determine the fixed vertex $v_{fix}$ coordinates;
d) mark all vertices on the right of all generators $N_r(a)$, $N_r(b)$; and
e) calculate the position of each vertex, except the fixed one, to be the weighted average of its neighbors.

Steps (c)-(e) were explained in Section 1.1.2. The cyclic boundary constraints are calculated separately for each of the generators in a pre-process using Equation 3. The time complexity of this stage is O(n), where n is the number of vertices of the mesh. Thus, the process is applied on genus-g objects with time complexity similar to current parameterization methods using barycentric coordinates, and the complexity does not depend on the genus but rather only on the number of vertices of the mesh.

1.2.3 Examples for Genus-g Objects

Figure 12A:
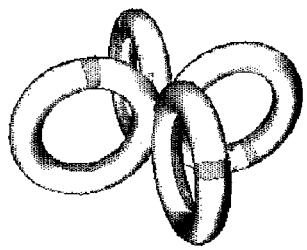
FIGS. 12a-12c illustrate a four circular torus: 12a is an object with its generators, left (yellow) and right (green and red) sides marked; 12a shows the resulting texture when using one cut (cut-graph method); and 12c shows the resulting texture when using the invention.
Figure 12B:
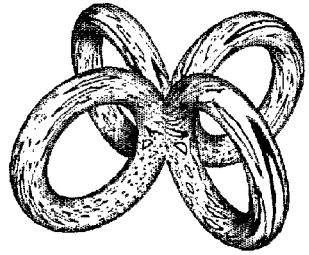
Figure 12C:
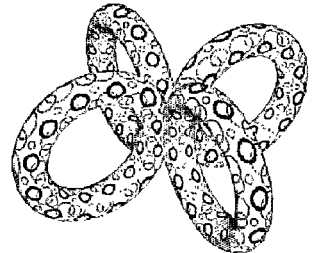

The generalized method for parameterization of genus-g meshes was applied to closed manifold genus-g meshes. The embedding characteristic is controlled by user-defined positive symmetric and asymmetric weights. The method has also been applied over meshes with obtuse angles without applying the remeshing stage as required by other methods. FIG. 12a shows a genus-4 object and its generators. The left side of the generators is marked in yellow, the right side of the meridian is marked in red and the right side of the longitude is marked in green. FIGS. 12b and 12c show two types of parameterization. The first parameterization was created on a 1-boundary surface using fixed boundaries, while the second resulting parameterization was created by our genus-g parameterization method. In FIG. 13b each pair of generators was placed on a different plane. After the parameterization coordinates were found, stretching between the planes was applied in the Z direction only for viewing purposes. This resulting stretched parameterized surface is given to provide intuition on the relationship between the generators and the g-planes of the g-holes. FIG. 14 shows a genus-5 shape composed of a torus and four vases equally spread around it. FIG. 14c shows that symmetry is preserved in the parameterization plane. FIG. 15 demonstrates the resulting parameterization using texture on a genus-7 object. Distortion occurred due to the singular points clearly seen on the ball as areas on the shape (on the bottom and middle of the shape). FIG. 16 demonstrates the feasibility of the method on a real test case genus-3 freeform mesh.

Appendix A. Finding the Generators of Genus-g Object

Figures 22A, 22B:
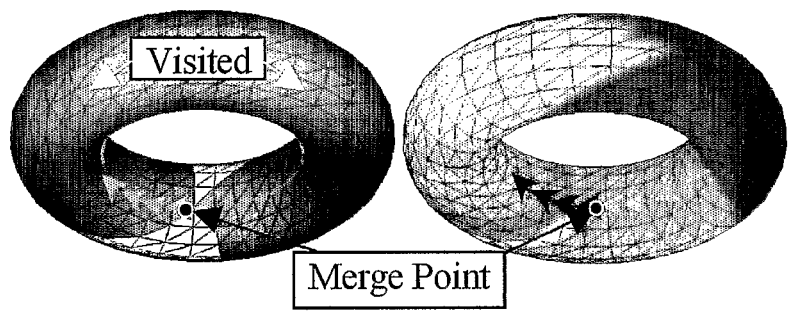
FIGS. 22a-22b illustrate constructing the second generator when a merge occurs in the process of finding the generators of a genus-g object: 22a visited region (in eggplant purple) grows until merge occurs; 22b Dijkstra color map over the visited region.

Our method for finding the generators of genus-g objects (see Steiner and Fischer, 2003) is used as a base for parameterization of genus-g objects. In this method two generators are calculated for each hole in a genus-g object. The method is based on an extension of the EdgeBreaker growing method. First, the mesh is traversed; while a contour homotopic to a circle is maintained. This contour is also called the active contour. While traversing the mesh, the algorithm adds faces, edges and points to the growing area, also called the visited region (FIG. 22). When an active contour touches itself, a split is generated, creating two contours. When an active contour touches another contour, a merge occurs. A merge indicates that a loop on the mesh has been closed. The point where the merge occurs is called a merge point. In case of a merge, the new generators are found as follows:

a) all generator edges found up to this point (except the last one) are marked as uncrossed;
b) the active contour is selected as a new generator;
c) the shortest path over the mesh from the merge point back to itself through the visited region is traced, yielding the second new generator;
d) as long as the number of found generators is less than 2g, where g is the genus, the mesh continues to be traversed until a new merge occurs or until the entire mesh is traversed; and
e) if a merge occurs, go to (a).

Marking all generator edges (except the last generators) as uncrossed ensures that the new path will not redefine a generator. A detailed description is defined in Steiner and Fischer, 2003.

Appendix B. Weighted Barycentric Coordinates

A common method used as a basis for parameterization of genus-g meshes is the weighted barycentric coordinates method. The basic idea of this method is to fix the boundary of a manifold mesh with 1-boundary onto a convex polygon and then repeatedly update each internal vertex as the weighted average of its neighbors. The resulting parameterization has no Holdovers when using positive weights and a convex boundary. The barycentric coordinate method can be formulated as the solution of the 2D Laplace equation of the interior vertices, as given in Equation 11, where the coefficient matrix $L_w$ is the Laplace matrix with respect to the weights of the mesh edges, V represents the 2D vertex coordinates in the parameterization plane, and vector b defines the constraints resulting from the 2D position of the boundary vertices. We define $L_w$ as (I−W), where I is the unity matrix and W is the weights matrix:

$$L_w V = (I-W)V = b \tag{11}$$

The weights matrix $W_{n \times n}$ and the constraints vector $b_{n \times l}$ are constructed as follows:

a) to each entry W(i,j) that has a corresponding edge $e_{ij} \in M$, where M is the mesh, assign a positive weight $w_{ij}$ such that $$\sum_{j \in N(i)} w_{ij} = 1,$$

where N(i) is the set of vertices neighboring the $i^{th}$ vertex;
b) to all other entries W(i,j) where $e_{ij} \notin M$ assign $w_{ij}=0$; and
c) the constraints vector $b_{n \times l}$ is constructed by embedding the boundary vertices in the plane such that they form a closed convex polygon.

The resulting parameterization coordinates of the vertices V is achieved by solving the linear system according to Equation 11. Because the sum of all weights $w_{ij}$ around vertex $v_i$ is 1, $L_w$ is singular. The rank of $L_w$ is (n−1). After one vertex is fixed in the parameterization plane, $L_w$ becomes weakly diagonal-dominated and therefore non-singular. The vector b has entries that are non-zero, so that this linear system has a unique solution. Due to the weakly dominated property of the $L_w$ matrix, this linear system can be solved using the iterative Gauss-Seidel procedure and is guaranteed to converge for any initial guess of V.

2. Remeshing of Genus-G Meshes

In Section 1 we introduced the new parameterization method that creates the parameterization surface P from the mesh M of a genus-g object. This section presents a novel method for remeshing using our new global parameterization approach that utilizes topological analysis. The remeshing problem can be defined as follows:

Problem Definition:

Given a parameterization surface P of a given mesh M and a 2D grid G. Map the 2D grid G onto the mesh M by utilizing the parameterization surface P. The mapping should be continuous and without distortions.

The new remeshing method is described the following sections. Section 2.1 presents the algorithm for remeshing, and Section 2.2 demonstrates the feasibility of the method through some examples.

2.1 Remeshing Algorithm

Figure 17A:
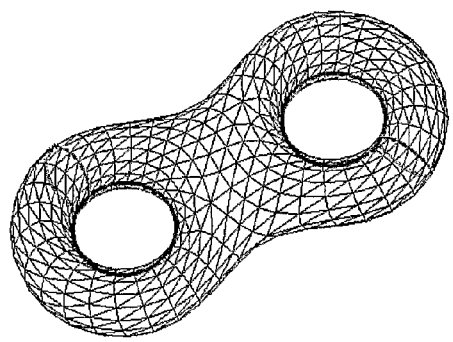
FIGS. 17a-17d illustrate remeshing of a figure eight shape: 17a is the original mesh with two pair of generators; 17b shows the parameterization space; 17c shows the remeshed parameterization space with rays parallel to the Z axes; and 17d shows the figure eight remeshed by quad.
Figure 17B:
Figure 17C:
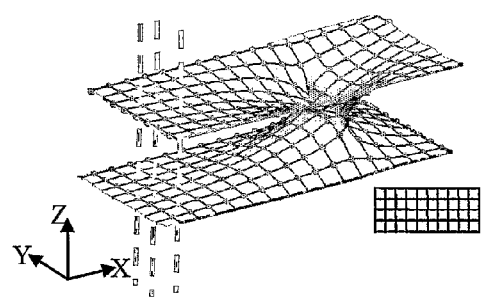
Figure 17D:
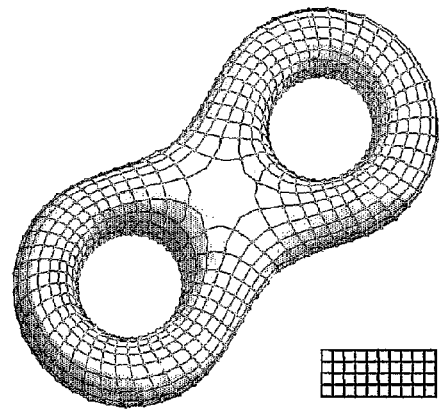

In this section we present the novel algorithm of the invention for remeshing genus-g meshes. Mapping a 2D grid G on the parameterization surface P of genus-g mesh M, where g is greater then 1, is not bijective. That is, mapping one point of the grid G will result in several points on the parameterization surface P. For texture mapping applications, such mapping is sufficient, since an image (colored pixels) is mapped where connectivity is not required. However, for remeshing applications, the connectivity of the projected grid vertices is crucial. Therefore, we should solve the problem of defining connectivity during mapping of the grid vertices on the parameterization surface (FIG. 17*c*). The proposed connectivity algorithm of the invention overcomes the above problem. First, we define some basic terms used in the algorithm:

Grid vertices/edges: The vertices (junctions) and the edges (connections between junctions) of the 2D grid.

Junction: 2D grid vertices projected onto the mesh M or onto the parameterization surface P.

Projected grid surface vertices: 2D grid vertices projected onto the parameterization surface.

Mesh triangle: Mesh triangle in 3D.

Projected mesh triangle: The projected mesh triangle on the parameterization surface P.

Cross edge: Edge of triangle that is crossed by a grid edge.

Cross point: An intersection point between a triangle edge and a grid edge.

Segment: Grid edge inside a projected mesh triangle.

Crossing Segments: Segments that cross one another.

Sub-segment: Segment inside a projected mesh triangle that is a part of a crossing segment.

Grid paths: Group of segments that connect junctions.

The structure of the 2D grid can be any pattern without restriction of shape, size and/or density of said pattern. We have overcome the problem of projecting a grid point onto more than one point on the original mesh. The junctions of the new mesh are calculated inside each of the projected triangles independently. Therefore, projected grid vertices can be calculated simultaneously inside all projected triangles. Connectivity is then found over the projected mesh using the grid edges (segments) inside the projected triangles. The resulting projected mesh is mapped onto the 3D mesh M using normalized coordinates.

The resulting new mesh consists of junctions and paths between them, as demonstrated in FIG. 17*c*. Then, in the following section we describe in detail the following algorithms: (a) finding junctions over the original mesh and (b) finding paths between junctions over the projected mesh.

2.1.1 Finding Junctions Over the Projected Mesh

Figure 6:
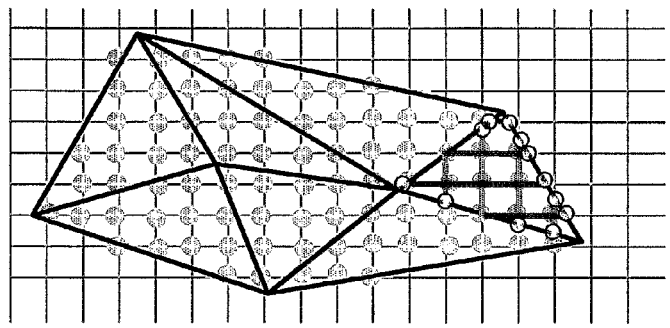
FIG. 6 shows an overlay of the parameterized triangles over the 2D grid, the cross edge points the junctions-points and the projected grid edges defined in each of the triangles.

The process of finding junctions over the projected mesh is as follows:

a) for each projected mesh triangle on the parameterization surface, find and mark all the grid edges that are contained in it (as shown in FIG. 6);

b) mark all junctions in each projected mesh triangle by finding intersections between the projected grid edges;

c) mark all cross points by finding intersections between projected grid edges and the edges of each projected mesh triangle;

d) construct the connectivity between the junctions, on the projected mesh, by tracing the segments between the junctions and by assisting the cross points found in (c) to track the path from one triangle to the other; and e) map the junctions and the paths from each projected mesh triangle into the 3D mesh triangle, using normalized coordinates.

Knowledge of the junctions and the paths between junctions enables us to know the new mesh vertices (junctions) and edges (paths between junctions). The connectivity of the new mesh is independent of the original mesh connectivity and is found during the mapping process. The connectivity is genus-dependent. The type (shape and size) of the new elements on the mesh are dictated by the 2D grid pattern. Most current applications use a pattern that is comprised of a two-dimensional manifold mesh with triangular elements

2.1.2 Finding Paths Between Junctions Over the Projected Mesh

The paths between junctions are found by the following stages:

a) subdivide crossing segments according to the junctions inside the projected triangles;

b) define cross points (FIG. 6) on each of the projected triangles edges;

c) for each of the triangles, traverse all junctions inside the triangle, and for each junction:

i. select an unmarked sub-segment and trace the path through other segments until it reaches a neighboring junction; the new junction can be on a different triangle; in that case, use the cross points as transition points between triangles;

ii. mark all segments and sub-segments in the path as belonging to the current path; and iii. go to (i) until no segments are left.

2.2 Remeshing Examples

The proposed remeshing method was developed for closed manifold genus-g meshes. The method has been applied over genus-g meshes with irregular and regular triangles. Our examples are divided into two main categories. FIGS. 17-20 demonstrate the feasibility of the remeshing process with triangles and quad elements on several objects with different genus, while FIG. 21 demonstrates the capabilities of changing the resolution and the shape of the elements by directly changing the 2D grid image.

Figure 18A:
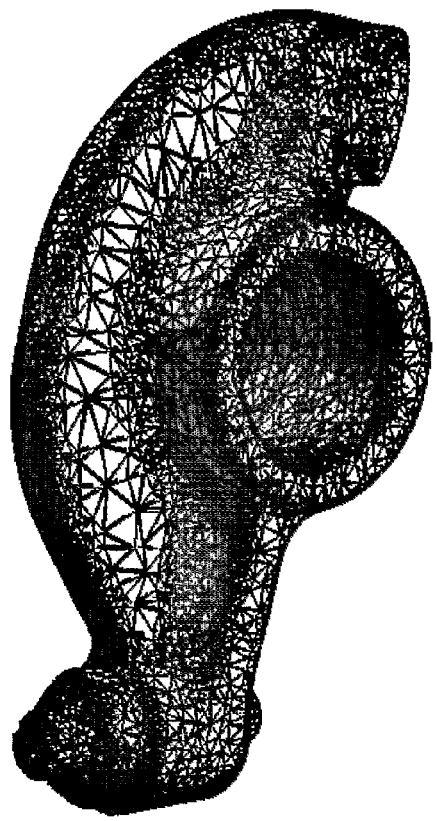
FIGS. 18a-18b shows a scanned mechanical part: 18a shows the original mesh with pair of generators, and 18b shows it remeshed by quads.
Figure 18B:
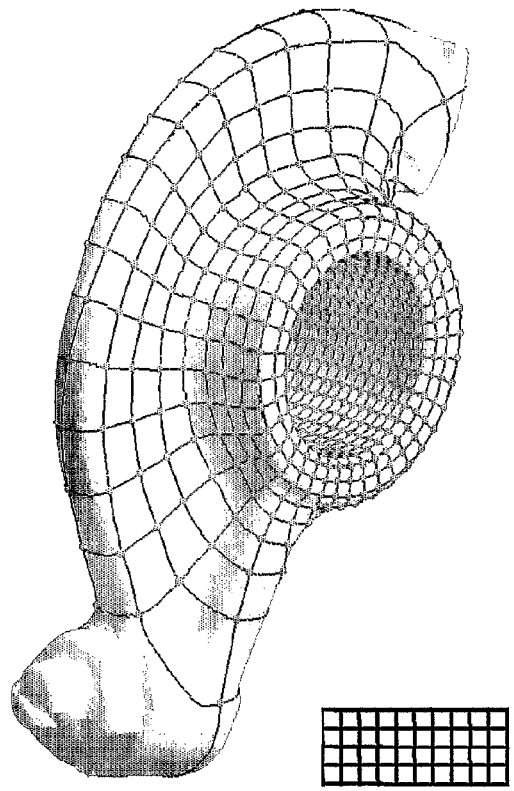
Figure 19A:
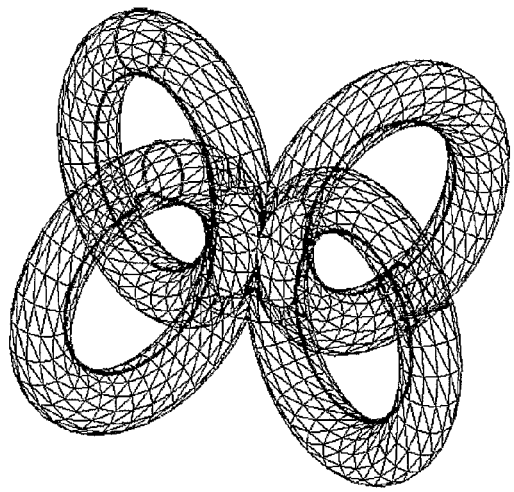
FIGS. 19a-19b show a genus-4 object: 19a shows the original mesh with pair of generators, and 19b show it remeshed by quads.
Figure 19B:
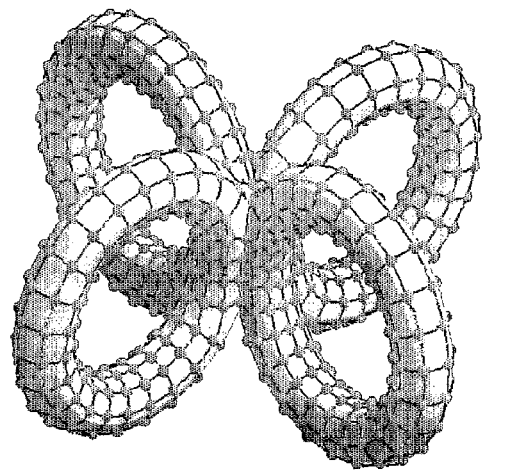

FIG. 17 presents a figure eight shape with a regular triangular mesh. Its parameterization surface is shown in FIG. 17*b*, while the new quad mesh applied over the original mesh is shown in FIG. 17*d* and over the parameterization surface in FIG. 17*c*. FIG. 18 presents a mechanical object of genus-1 that was scanned and reconstructed as an irregular triangular mesh, with its two generators (FIG. 18*a*) and the resulting new quad mesh. FIG. 19 presents a genus-4 triangular mesh and the resulting quad mesh. FIG. 20 presents a scanned artistic sculpture of genus-3 and its reconstructed mesh. The resulting quad mesh was obtained using the remeshing method of the invention. FIG. 21 demonstrates the power of the method as a multiresolution remeshing method that is independent of the original mesh structure. FIGS. 21a through 21d present the resulting quad mesh using scaled quad 2D grids and the same parameterization space of the figure eight. FIGS. 21e and 21f present the resulting triangulated mesh using different scales of triangular 2D grids.

In one embodiment of the present invention, the structure of the two-dimensional grid is comprised of multi-patterns. Any number and type of patterns can be "patched" together, for example, different triangles mixed with quads. A commercial implementation may offer a catalog of patterns that a user can mix and match. Alternatively, the user is able to create any personal patterns or mix of patterns. Multi-patterns are used for adaptive meshing according to the components characteristic (shape, material etc.). Moreover, multi-patterns can be used for calculating the adaptive grid for a mechanical simulation or the Finite-Element analysis. For example, the temperature or pressure gradient map dictates an adaptive grid on the part. Using the method of the invention, the adaptive grid can be calculated automatically.

In another embodiment of the invention, a three-dimensional meshed model is comprised of segments, and multi-two-dimensional grids or multi-patterns are mapped to said segments. The adaptive grid can be composed by different patterns. The required patterns are defined usually by the finite element analysis module. For example, the three-dimensional meshed model can represent an object that is composed of different components where each part can be made of a different material and have different characteristics and features. It can be useful, using the invention, to assign a different pattern to each component or segment of the part.

3. Implementation

The present invention may be implemented, at least in part, in the form of a computer software program stored in a computer memory or storage device such as a hard disk (magnetic or optic), CD, DVD etc. The system running the application includes a processor coupled to an internal memory (Read Only Memory) and an input/output (I/O) controller. The I/O controller in conjunction with the processor directs the operation of a number of peripheral components including a display, a disk-based storage device and one or more interface devices which may include, for example, a printer, a keyboard, a mouse and a network interface card. The system may represent portions of a desktop or portable personal computer, a microcomputer, a workstation, a mainframe computer or other type of digital data processor. The three-dimensional meshed model and two-dimensional grid or grids are stored in memory and in disk-based storage devices. The memory and disk-based storage device may be electronic, magnetic or optical storage devices. The application and its data may be located in different locations or environments and communicate via networking means.

4. Conclusion

The present invention proposes a novel remeshing approach for genus-g meshes that overcomes distortion problems. The proposed approach is based on continuous mapping of a 2D grid on the 3D meshed model. The criteria of the new mesh can be defined directly on the 2D grid. The remeshing is invariant to the original mesh. Due to topological analysis, the mapping of the 2D grid onto the 3D mesh minimizes distortion and guarantees continuity. The 2D grid, the element shapes and the density (multiresolution) can be changed straightforwardly, thus generating a modular approach.

Moreover, the mapping utilizes an efficient parameterization technique, also developed by the authors, that utilizes knowledge of the object's topology. The advantages of the proposed parameterization method over other parameterization methods for genus-g meshes are: (a) the resulting flattened mesh is unfolded; (b) distortions are low, especially near the boundaries (in our case, the generators); (c) positive symmetric and asymmetric weights are used for parameterization; and (d) the parameterization method time complexity is independent of the object's genus. The combination of the above advantages results in a better parameterization with respect to known state-of-the-art parameterization methods for genus-g objects. Moreover, this is the first time barycentric coordinates have been generalized for genus-g meshes.

Applying the new remeshing method while utilizing the proposed new parameterization approach leads to fast and robust remeshing that enables changing the mesh elements (density and shape) straightforwardly and intuitively. This characteristic can contribute significantly to the Finite-Element analysis that is common in engineering applications.

For example, many medical applications today are based on computerized visualization. Lately the computerized analysis and validation have also been developed. The method of the invention is highly important for medical analysis (for example, surgery simulations on bones and tissues where shape deformations are calculated). Currently, using the method of the invention, it is possible to refer to medical models that are represented by meshes as opposed to current applications that use only Magnetic Resonance Imaging (MRI) or Computerized Tomography (CT).

Although the invention has been described in detail, nevertheless changes and modifications, which do not depart from the teachings of the present invention will be evident to those skilled in the art. Such changes and modifications are deemed to come within the purview of the present invention and the appended claims.

The invention claimed is:

1. A computerized remeshing method of a three-dimensional meshed model by mapping a two-dimensional grid to said three-dimensional meshed model, the method executed by a computer comprising a processor and memory and comprising the steps of:
   (i) constructing by the processor a parameterization surface of said three-dimensional meshed model is performed using the following steps:
      i. finding a pair of generators for each hole of said three-dimensional meshed model;
      ii. determining the desired weights over the edges of the three-dimensional meshed model;
      iii. defining a linear system using cyclic boundary constraints and edges weights; and
      iv. calculating the parameterization surface by solving the linear system and finding the parameterization coordinates of the three-dimensional meshed model;
   (ii) mapping by the processor the resulted parameterization surface of the three-dimensional meshed model to said two-dimensional grid, wherein the mesh-elements of said two-dimensional grid are of different geometric shape than the mesh-elements of said three-dimensional meshed model;
   (iii) mapping by the processor each node of the two-dimensional grid to the three-dimensional meshed model;

(iv) connecting by the processor the nodes on the three-dimensional meshed model according to connectivity relations which are defined by the two-dimensional grid edges; and (v) connecting by the processor the new edges on the three-dimensional meshed model via the crossing points, thus defining the new three-dimensional meshed model.

2. The remeshing method of claim 1, wherein said three-dimensional meshed model is a three-dimensional closed manifold genus-g meshed model and g is greater than zero.

3. The remeshing method of claim 2, wherein said two generators are the meridian and longitude.

4. The remeshing method of claim 1, wherein the structure of said two-dimensional grid is any pattern without any limitations on the shape, size and/or density of said pattern.

5. The remeshing method of claim 4, wherein said pattern is comprised of a two-dimensional manifold mesh with triangular elements.

6. The remeshing method of claim 4, wherein said pattern is comprised of a manifold mesh with polygonal elements, and at least one element is not a triangular element.

7. The remeshing method of claim 4, wherein said structure is comprised of multi-patterns.

8. The remeshing method of claim 1, wherein said mapping is continuous.

9. The remeshing method of claim 1, wherein said mapping is performed with little or no distortion.

10. The remeshing method of claim 1, wherein said three-dimensional meshed model is comprised of segments and multi-two-dimensional grids or multi-patterns are mapped to said segments.

11. The remeshing method according to claim 10 used for adaptive meshing, wherein the density of the mesh or the type of elements can be changed by directly changing the parameters of the two-dimensional grid.

12. The remeshing method of claim 11, wherein the density of any element can be changed automatically according to different geometric and/or physical criteria.

13. The remeshing method of claim 12, wherein said geometric criteria is curvature.

14. The remeshing method of claim 1, used in applications for computer aided design, visualization of three-dimensional models, analysis of three-dimensional models or manufacturing of three-dimensional models.

15. A system for remeshing of a three-dimensional meshed model by mapping a two-dimensional grid to said three-dimensional meshed model, said system comprising:

(i) means for constructing a parameterization surface of said three-dimensional meshed model is performed using the following steps:
   i. finding a pair of generators for each hole of said three-dimensional meshed model;
   ii. determining the desired weights over the edges of the three-dimensional meshed model;
   iii. defining a linear system using cyclic boundary constraints and edges weights; and
   iv. calculating the parameterization surface by solving the linear system and finding the parameterization coordinates of the three-dimensional meshed model;

(ii) means for mapping the resulted parameterization surface of the three-dimensional meshed model to said two-dimensional grid, wherein the mesh-elements of said two-dimensional grid are of different geometric shape than the mesh-elements of said three-dimensional meshed model;

(iii) means for mapping each node of the two-dimensional grid to the three-dimensional meshed model;

(iv) means for connecting the nodes on the three-dimensional meshed model according to connectivity relations which are defined by the two-dimensional grid edges; and (v) means for connecting the new edges on the three-dimensional meshed model via the crossing points and by that defining the new three-dimensional meshed model.

16. The system of claim 15, wherein said three-dimensional meshed model is a three-dimensional closed manifold genus-g meshed model and g is greater than zero.

17. The system of claim 15, wherein the structure of said two-dimensional grid is one or more patterns without any limitations on the shape, size and/or density of said one or more patterns, such that each pattern is comprised of a two-dimensional manifold mesh with continuous polygonal elements, said polygonal elements optionally comprising one or more triangular elements.

18. The system according to claim 17 used for adaptive meshing, wherein the density of the mesh or the type of elements can be changed by directly changing the parameters of the two-dimensional grid such that the density of any element can be changes automatically according to different geometric and/or physical criteria.

19. An apparatus for remeshing of a three-dimensional meshed model by mapping a two-dimensional grid to said three-dimensional meshed model, the apparatus comprising:

(i) a memory for storing said three-dimensional meshed model and said two-dimensional grid by performing the following steps:
   i. finding a pair of generators for each hole of said three-dimensional meshed model;
   ii. determining the desired weights over the edges of the three-dimensional meshed model;
   iii. defining a linear system using cyclic boundary constraints and edges weights; and
   iv. calculating the parameterization surface by solving the linear system and finding the parameterization coordinates of the three-dimensional meshed model;

(ii) at least one processor operative to construct a parameterization surface of said three-dimensional meshed model;

(iii) means for mapping the resulted parameterization surface of the three-dimensional meshed model to said two-dimensional grid;

(iv) means for mapping each node of the two-dimensional grid to the three-dimensional meshed model, wherein the mesh-elements of said two-dimensional grid are of different geometric shape than the mesh-elements of said three-dimensional meshed model;

(v) means for to connecting the nodes on the three-dimensional meshed model according to connectivity relations which are defined by the two-dimensional grid edges; and (vi) means for to connecting the new edges on the three-dimensional meshed model via the crossing points and by that defining the new three-dimensional meshed model.

20. The apparatus of claim 19, wherein said three-dimensional meshed model is a three-dimensional closed manifold genus-g meshed model and g is greater than zero.

21. The apparatus of claim 19, the structure of said two-dimensional grid is one or more patterns without any limitations on the shape, size and/or density of said one or more patterns, such that each pattern is comprised of a two-dimensional manifold mesh with continuous polygonal elements, said polygonal elements optionally comprising one or more triangular elements.

22. The apparatus according to claim 21 used for adaptive meshing, wherein the density of the mesh or the type of elements can be changed by directly changing the parameters of the two-dimensional grid such that the density of any element can be changed automatically according to different geometric and/or physical criteria.

* * * * *